W. A. FLANDERS

Bee Hive.

No. 10,152.

Patented Oct. 25, 1853.

UNITED STATES PATENT OFFICE.

WOOSTER A. FLANDERS, OF SHARON, VERMONT.

BEEHIVE.

Specification of Letters Patent No. 10,152, dated October 25, 1853.

*To all whom it may concern:*

Be it known that I, WOOSTER A. FLANDERS, of Sharon, in the county of Windsor and State of Vermont, have invented certain new and useful Improvements in Beehives; and I hereby declare the following to be a full, clear, and exact description of my invention, reference being had to the annexed drawings, making part of this specification.

It is often desirable to prevent the issuing of second swarms from hives, but no efficient method of doing so is known to the apiarian; neither is there any sure method by which to prevent weak families from being pillaged by their more powerful neighbors.

By my invention I am enabled to accomplish both these ends; and it consists in the adaptation of an extra passage to the hive, which is capable of being gaged so that while the working bees are permitted to pass and repass without hindrance, the passage way is not sufficiently large to permit the queen to leave the hive, she being larger than the other bees.

It is known that after the issuing of the first swarm, several queens are hatched, and that all subsequent swarms are driven out by the natural repugnance which exists between the queens, and that if the queen first hatched be detained until after another comes out, a battle ensues in which one of them is sacrificed.

By the use of my invention, when after swarms are not desired, the queens are thus detained until this conflict has taken place. The survivor will not then leave the hive and the swarm will not issue as an empty bee can pass with ease through a space into which a full one cannot enter, the same passage may be so gaged, that no bee that is gorged with honey can pass out from the hive, while the inmates are permitted to pass and repass freely, all robberies may thus be instantly checked, as no full bee can leave the hive.

In order that others skilled in the art may make and use my invention I will proceed to describe its nature and operation.

Figure 1:
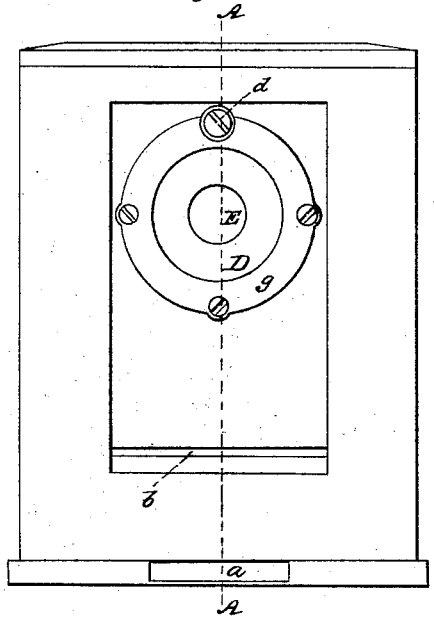
Figure 2:
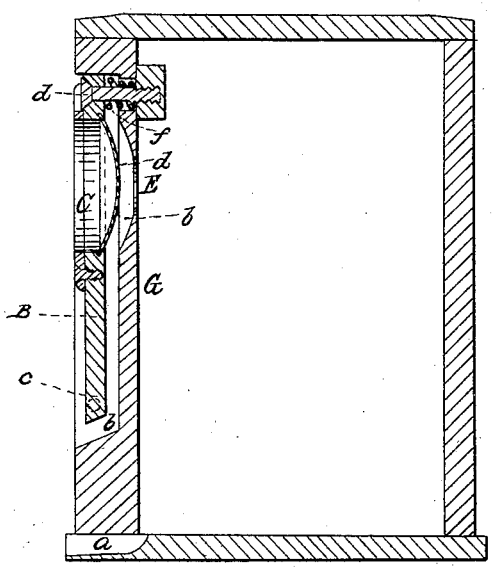

Figure 1, is a front view of a hive with my improvement attached. Fig. 2, is a vertical section through the same upon the line A—A.

$a$ is the entrance to the hive.

$b$ is a passage which may be enlarged or diminished when required as follows:

B—is a plate hinged at $c$ in any appropriate manner within a recess in one side of the hive and having an opening at C to which is fitted the convex glass D.

E is an opening into the hive around which the side of the box is chamfered as seen in Fig. 2 to correspond with the convexity of the glass D. If the latter be made flat or of plate or window glass, this chamfering of the side G is not necessary.

$d$ is a screw passing through the plate B, and into the body of the hive, by means of which the distance between the glass D and the side of the hive G is graduated.

$f$ is a spiral or other spring by which the plate B is pressed off from the hive as the screw $d$, is withdrawn.

$g$ is a metallic ring or plate which may be placed around the opening C.

It is evident that the plate B, may be entirely of glass, and may be confined in grooves and separated by springs, being so arranged that the space between the glass and the hive can be gaged and regulated as before.

Operation: When it is found desirable to prevent a hive furnished with this device from swarming twice in the same season; eight to ten days after the issuing of the first swarm, the passage $b$ is graduated by means of the screw $d$ to the size of a worker bee, and the entrance $a$ is closed by a block or in any suitable manner: the ordinary operations of the hive are thus not interrupted, and should more than one queen be hatched as is often the case, neither being able to escape, a conflict ensues between them and the survivor no longer strives to leave the hive with a swarm.

When it is discovered that a hive is attacked by robbers, the plate B is gaged to the back of an empty bee and the robbers if they succeed in gaining an entrance through the narrow passage $b$ will find themselves foiled, as they can carry nothing away with them, and will therefore not return again. It is not absolutely necessary that the hive have other entrance than that at $b$, which under ordinary circumstances may be left sufficiently wide open to admit of the passage of any and all of the bees and may be closed and adjusted only when found necessary.

It is evident that my invention may be carried out in a great variety of ways,—I do not therefore confine myself to the peculiar construction above described, but

What I claim as my invention and which I desire to secure by Letters Patent is—

The adjustable passage $b$, by which the entrance to the hive may be enlarged or diminished in manner and for the purpose substantially as set forth.

In testimony whereof I have hereto set my signature this second day of May A. D. one thousand eight hundred and fifty three.

W. A. FLANDERS.

Witnesses:
 LUTHER FAY,
 JACOB L. FAY.